US008593425B2

(12) United States Patent
Hong et al.

(10) Patent No.: US 8,593,425 B2
(45) Date of Patent: Nov. 26, 2013

(54) TOUCH SENSOR PANEL DESIGN

(71) Applicant: Apple Inc., Cupertino, CA (US)

(72) Inventors: Seung Jae Hong, Sunnyvale, CA (US); Martin Paul Grunthaner, Mountain View, CA (US); Steven Porter Hotelling, Los Gatos, CA (US); Lynn Youngs, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/737,779

(22) Filed: Jan. 9, 2013

(65) Prior Publication Data

US 2013/0120303 A1 May 16, 2013

Related U.S. Application Data

(63) Continuation of application No. 12/500,911, filed on Jul. 10, 2009.

(60) Provisional application No. 61/168,543, filed on Apr. 10, 2009.

(51) Int. Cl.
*G06F 3/041* (2006.01)
(52) U.S. Cl.
USPC .......................................... 345/173; 345/174
(58) Field of Classification Search
USPC ................................................. 345/173, 174
See application file for complete search history.

(56) References Cited

U.S. PATENT DOCUMENTS

| 4,087,625 A | 5/1978 | Dym et al. |
| 4,090,092 A | 5/1978 | Serrano |
| 4,304,976 A | 12/1981 | Gottbreht et al. |
| 4,475,235 A | 10/1984 | Graham |
| 4,659,874 A | 4/1987 | Landmeier |
| 5,194,862 A | 3/1993 | Edwards |

(Continued)

FOREIGN PATENT DOCUMENTS

| CN | 1672119 A | 9/2005 |
| CN | 1711520 A | 12/2005 |

(Continued)

OTHER PUBLICATIONS

Cassidy, R. (Feb. 23, 2007). "The Tissot T-Touch Watch—A Groundbreaking Timepiece," located at <http://ezinearticles.com/?The-Tissot-T-Touch-Watch-A-Groundbreaking-Timepiece&id . . . >, last visited Jan. 23, 2009, two pages.

(Continued)

*Primary Examiner* — Amare Mengistu
*Assistant Examiner* — Jennifer Zubajlo
(74) *Attorney, Agent, or Firm* — Morrison & Foerster LLP

(57) ABSTRACT

A touch sensor panel including a plurality of drive lines crossing a plurality of sense lines, forming an array. The plurality of drive lines and the plurality of sense lines are formed by interconnecting sections of at least one conductive material having a truncated diamond shape or formed of interconnected conductive lines. At least one conductive dummy region may be disposed in an area of the touch sensor panel around the truncated diamond shape sections or interconnected conductive lines of the plurality of drive lines and the plurality of sense lines. One or more lines may be formed overlapping the interconnected sections of each of the plurality of drive lines and the plurality of sense lines.

13 Claims, 14 Drawing Sheets

(56) References Cited

U.S. PATENT DOCUMENTS

| | | | |
|---|---|---|---|
| 5,317,919 A | 6/1994 | Awtrey | |
| 5,459,463 A | 10/1995 | Gruaz et al. | |
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 6,730,863 B1 | 5/2004 | Gerpheide et al. | |
| 6,970,160 B2 | 11/2005 | Mulligan et al. | |
| 7,015,894 B2 | 3/2006 | Morohoshi | |
| 7,030,860 B1 | 4/2006 | Hsu et al. | |
| 7,129,935 B2 | 10/2006 | Mackey | |
| 7,138,686 B1 | 11/2006 | Banerjee et al. | |
| 7,184,064 B2 | 2/2007 | Zimmerman et al. | |
| 7,538,760 B2 | 5/2009 | Hotelling et al. | |
| 7,548,073 B2 | 6/2009 | Mackey et al. | |
| 7,639,234 B2 | 12/2009 | Orsley | |
| 7,663,607 B2 | 2/2010 | Hotelling et al. | |
| 7,932,898 B2 | 4/2011 | Philipp et al. | |
| 8,120,371 B2 | 2/2012 | Day et al. | |
| 8,223,133 B2 | 7/2012 | Hristov | |
| 8,319,747 B2 | 11/2012 | Hotelling et al. | |
| 8,479,122 B2 | 7/2013 | Hotelling et al. | |
| 8,487,898 B2 | 7/2013 | Hotelling | |
| 2003/0076325 A1 | 4/2003 | Thrasher | |
| 2004/0017362 A1 | 1/2004 | Mulligan et al. | |
| 2004/0090429 A1 | 5/2004 | Geaghan et al. | |
| 2004/0119701 A1 | 6/2004 | Mulligan et al. | |
| 2004/0239650 A1* | 12/2004 | Mackey | 345/174 |
| 2005/0073507 A1 | 4/2005 | Richter et al. | |
| 2005/0083307 A1 | 4/2005 | Aufderheide et al. | |
| 2005/0126831 A1 | 6/2005 | Richter et al. | |
| 2005/0146509 A1 | 7/2005 | Geaghan et al. | |
| 2005/0270039 A1 | 12/2005 | Mackey | |
| 2005/0280639 A1 | 12/2005 | Taylor et al. | |
| 2006/0026521 A1 | 2/2006 | Hotelling et al. | |
| 2006/0038791 A1 | 2/2006 | Mackey | |
| 2006/0097991 A1* | 5/2006 | Hotelling et al. | 345/173 |
| 2006/0132463 A1 | 6/2006 | Lee et al. | |
| 2006/0146484 A1 | 7/2006 | Kim et al. | |
| 2006/0197753 A1 | 9/2006 | Hotelling | |
| 2007/0008299 A1* | 1/2007 | Hristov | 345/173 |
| 2007/0074914 A1 | 4/2007 | Geaghan et al. | |
| 2007/0229468 A1* | 10/2007 | Peng et al. | 345/173 |
| 2007/0247443 A1 | 10/2007 | Philipp | |
| 2007/0279395 A1 | 12/2007 | Philipp | |
| 2008/0024456 A1 | 1/2008 | Peng | |
| 2008/0062140 A1 | 3/2008 | Hotelling et al. | |
| 2008/0074398 A1 | 3/2008 | Wright | |
| 2008/0136787 A1 | 6/2008 | Yeh et al. | |
| 2008/0158167 A1 | 7/2008 | Hotelling et al. | |
| 2008/0158181 A1 | 7/2008 | Hamblin et al. | |
| 2008/0264699 A1 | 10/2008 | Chang et al. | |
| 2008/0277259 A1 | 11/2008 | Chang | |
| 2008/0283175 A1 | 11/2008 | Hagood et al. | |
| 2008/0309633 A1* | 12/2008 | Hotelling et al. | 345/173 |
| 2008/0309635 A1 | 12/2008 | Matsuo | |
| 2009/0002337 A1 | 1/2009 | Chang | |
| 2009/0019344 A1 | 1/2009 | Yoon et al. | |
| 2009/0054107 A1 | 2/2009 | Feland et al. | |
| 2009/0091551 A1 | 4/2009 | Hotelling et al. | |
| 2009/0135157 A1 | 5/2009 | Harley | |
| 2009/0182189 A1 | 7/2009 | Lira | |
| 2009/0184937 A1 | 7/2009 | Grivna | |
| 2009/0236151 A1 | 9/2009 | Yeh et al. | |
| 2009/0242283 A1 | 10/2009 | Chiu | |
| 2009/0267902 A1 | 10/2009 | Nambu et al. | |
| 2009/0273577 A1 | 11/2009 | Chen et al. | |
| 2009/0303189 A1 | 12/2009 | Grunthaner et al. | |
| 2009/0309850 A1 | 12/2009 | Yang | |
| 2009/0314621 A1 | 12/2009 | Hotelling | |
| 2009/0315854 A1 | 12/2009 | Matsuo | |
| 2010/0001973 A1 | 1/2010 | Hotelling et al. | |
| 2010/0007616 A1 | 1/2010 | Jang | |
| 2010/0059294 A1 | 3/2010 | Elias et al. | |
| 2010/0079384 A1 | 4/2010 | Grivna | |
| 2010/0110035 A1 | 5/2010 | Selker | |
| 2010/0149108 A1 | 6/2010 | Hotelling et al. | |
| 2010/0194696 A1 | 8/2010 | Chang et al. | |
| 2010/0253638 A1 | 10/2010 | Yousefpor et al. | |
| 2010/0328228 A1 | 12/2010 | Elias | |
| 2010/0328248 A1 | 12/2010 | Mozdzyn | |
| 2011/0007020 A1 | 1/2011 | Hong | |
| 2013/0120303 A1 | 5/2013 | Hong et al. | |

FOREIGN PATENT DOCUMENTS

| | | |
|---|---|---|
| CN | 1782837 A | 6/2006 |
| CN | 1818842 A | 8/2006 |
| CN | 1864124 A | 11/2006 |
| CN | 1945516 A | 4/2007 |
| CN | 101046720 A | 10/2007 |
| CN | 101071354 A | 11/2007 |
| DE | 11 2008 001 245 T5 | 3/2010 |
| EP | 0 853 230 A1 | 7/1998 |
| EP | 1 192 585 A1 | 12/2000 |
| EP | 1 192 585 B2 | 12/2000 |
| EP | 1 573 706 A2 | 2/2004 |
| EP | 1 573 706 A3 | 2/2004 |
| EP | 1 644 918 A2 | 12/2004 |
| EP | 2 077 489 A1 | 7/2009 |
| GB | 1 546 317 A | 5/1979 |
| GB | 2 144 146 A | 2/1985 |
| GB | 2 428 306 A | 1/2007 |
| GB | 2 437 827 A | 11/2007 |
| GB | 2 450 207 A | 12/2008 |
| JP | 2000-163031 A | 6/2000 |
| JP | 2002-342033 A | 11/2002 |
| JP | 2004-503835 A | 2/2004 |
| JP | 2005-084128 A | 3/2005 |
| JP | 2007-018515 A | 1/2007 |
| JP | 2008-510251 A | 4/2008 |
| JP | 2010-0528186 A | 8/2010 |
| TW | M344522 | 11/2008 |
| TW | M344544 | 11/2008 |
| WO | WO-01/97204 A1 | 12/2001 |
| WO | WO-2005/114369 A2 | 12/2005 |
| WO | WO-2006/023147 A2 | 3/2006 |
| WO | WO-2006/023147 A3 | 3/2006 |
| WO | WO-2006/104745 A2 | 10/2006 |
| WO | WO-2006/104745 A3 | 10/2006 |
| WO | WO-2006/130584 A2 | 12/2006 |
| WO | WO-2006/130584 A3 | 12/2006 |
| WO | WO-2007/034591 A1 | 3/2007 |
| WO | WO-2007/054018 A1 | 5/2007 |
| WO | WO-2007/115032 A2 | 10/2007 |
| WO | WO-2007/146785 A2 | 12/2007 |
| WO | WO-2007/146785 A3 | 12/2007 |
| WO | WO-2008/007118 A2 | 1/2008 |
| WO | WO-2008/007118 A3 | 1/2008 |
| WO | WO-2008/076237 A2 | 6/2008 |
| WO | WO-2008/076237 A3 | 6/2008 |
| WO | WO-2008/108514 A1 | 9/2008 |
| WO | WO-2008/135713 A1 | 11/2008 |
| WO | WO-2009/046363 A1 | 4/2009 |
| WO | WO-2009/132146 A1 | 10/2009 |
| WO | WO-2009/132150 A1 | 10/2009 |
| WO | WO-2010/117882 A2 | 10/2010 |

OTHER PUBLICATIONS

Chinese Search Report mailed Jan. 7, 2011, for CN Application No. 2009200081997, filed Apr. 24, 2009, with English Translation, 14 pages.

Chinese Search Report mailed Jan. 10, 2011, for CN Application No. 2008201338142, filed Sep. 27, 2008, with English Translation, 25 pages.

European Search Report mailed Mar. 19, 2009, for EP Application No. 08017396.6, filed Oct. 8, 2008, seven pages.

(56) References Cited

OTHER PUBLICATIONS

Final Office Action mailed Jun. 8, 2011, for U.S. Appl. No. 12/038,760, filed Feb. 27, 2008, 20 pages.
Final Office Action mailed Dec. 15, 2011, for U.S. Appl. No. 12/333,250, filed Dec. 11, 2008, 12 pages.
Final Office Action mailed Aug. 31, 2012, for U.S. Appl. No. 12/110,075, filed Apr. 25, 2008, 15 pages.
Great Britain Search Report mailed Jan. 19, 2009, for GB Application No. GB0817242.1, filed Sep. 22, 2008, two pages.
Great Britain Search Report mailed Jan. 19, 2010, for GB Application No. GB0817242.1, filed Sep. 22, 2008, two pages.
International Search Report mailed on Mar. 19, 2009, for PCT Application No. PCT/US2008/078836, filed on Oct. 3, 2008, four pages.
International Search Report mailed Jul. 17, 2009, for PCT Application No. PCT/US2009/041460, three pages.
International Search Report mailed Jan. 14, 2011, for PCT Application No. PCT/US2010/029698, filed Apr. 1, 2010, 5 pages.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Non-Final Office Action mailed Feb. 4, 2011, for U.S. Appl. No. 12/038,760, filed Feb. 27, 2008, 18 pages.
Non-Final Office Action mailed Jul. 8, 2011, for U.S. Appl. No. 12/110,075, filed Apr. 25, 2008, 14 pages.
Non-Final Office Action mailed Aug. 17, 2011, for U.S. Appl. No. 12/333,250, filed Dec. 11, 2008, 12 pages.
Non-Final Office Action mailed Jan. 25, 2012, for U.S. Appl. No. 12/110,075, filed Apr. 25, 2008, 21 pages.
Non-Final Office Action mailed Jun. 7, 2012, for U.S. Appl. No. 12/500,911, filed Jul. 10, 2009, 16 pages.
Notice of Allowance mailed Aug. 28, 2012, for U.S. Appl. No. 12/333,250, filed Dec. 11, 2008, nine pages.
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI '92, pp. 659-660.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Notice of Allowance mailed May 23, 2013, for U.S. Appl. No. 12/110,024, filed Apr. 25, 2008, five pages.
Final Office Action mailed Jan. 3, 2013, for U.S. Appl. No. 11/818,498, filed Jun. 13, 2007, 17 pages.
Final Office Action mailed Jul. 19, 2013, for U.S. Appl. No. 12,545/604, filed Aug. 21, 2009, 17 pages.
Non-Final Office Action mailed May 25, 2012, for U.S. Appl. No. 11/818,498, filed Jun. 13, 2007, 16 pages.
j Non-Final office Action mailed Jan. 7, 2013, for U.S. Appl. No. 12/545,604, filed Aug. 21, 2009, 12 pages.
Non-Final Office Action mailed Mar. 28, 2013, for U.S. Appl. No. 12/110,075 filed Apr. 25, 2008, 14 pages.
Search Report mailed Apr. 29, 2009, for NL Application No. 2001672, with English translation of Written Opinion, eight pages.
Final Office Action mailed Apr. 30, 2013, for U.S. Appl. No. 12/494,173, filed Jun. 29, 2009, 7 pages.
Final Office Action mailed May 22, 2013, for U.S. Appl. No. 12/206,680, filed Sep. 8, 2008, 16 pages.
Final Office Action mailed Jul. 23, 2013, for U.S. Appl. No. 12,038,760, filed Feb. 27, 2008, 20 pages.
Non-Final Office Action mailed Jun. 9, 2011, for U.S. Appl. No. 12/206,680, filed Sep. 8, 2008, 13 pages.
Non-Final Office Action mailed Sep. 26, 2012, for U.S. Appl. No. 12/206,680, filed Sep. 8, 2008, 14 pages.
Non-Final Office Action mailed Nov. 28, 2012, for U.S. Appl. No. 12/494,173, filed Jun. 29, 2009, six pages.
Notice of Allowance mailed Aug. 19, 2013, for U.S. Appl. No. 12/500,911, filed Jul. 10, 2009, six pages.
Chinese Search Report completed Jun. 3, 2011, for CN Patent Application No. ZL2009201524013, with English Translation, 20 pages.
Final Office Action mailed Jan. 19, 2012, for U.S. Appl. No. 12/110,024, filed Apr. 25, 2008, 12 pages.
Final Office Action mailed Dec. 24, 2012, for U.S. Appl. No. 12/110,024, filed Apr. 25, 2008, 21 pages.
Final Office Action mailed Feb. 5, 2013, for U.S. Appl. No. 12/500,911, filed Jul. 10, 2009, 15 pages.
International Search Report mailed Aug. 5, 2009, for PCT Application No. PCT/US2009/041465, filed Apr. 22, 2009, four pages.
Non-Final Office Action mailed Jul. 11, 2011, for U.S. Appl. No. 12/110,024, filed Apr. 25, 2008, 12 pages.
Non-Final Office Action mailed Jul. 3, 2012, for U.S. Appl. No. 12/110,024, filed Apr. 25, 2008, 19 pages.
Non-Final Office Action mailed Jan. 2, 2013, for U.S. Appl. No. 12/038,760, filed Feb. 27, 2008, 18 pages.

* cited by examiner

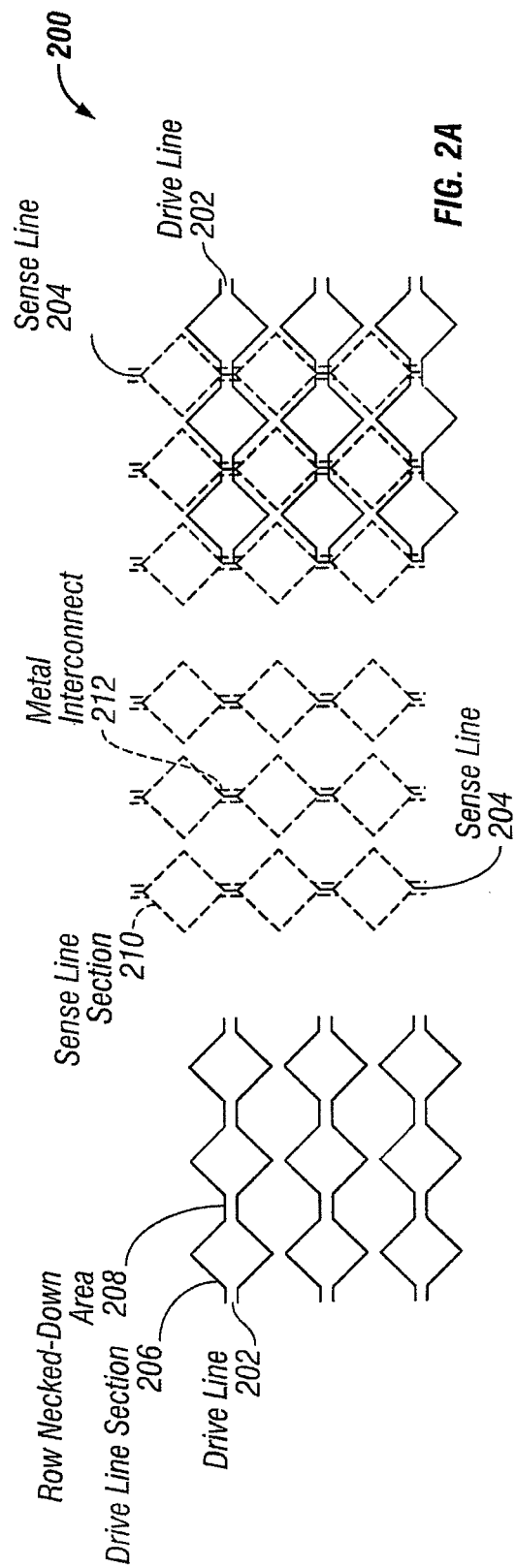
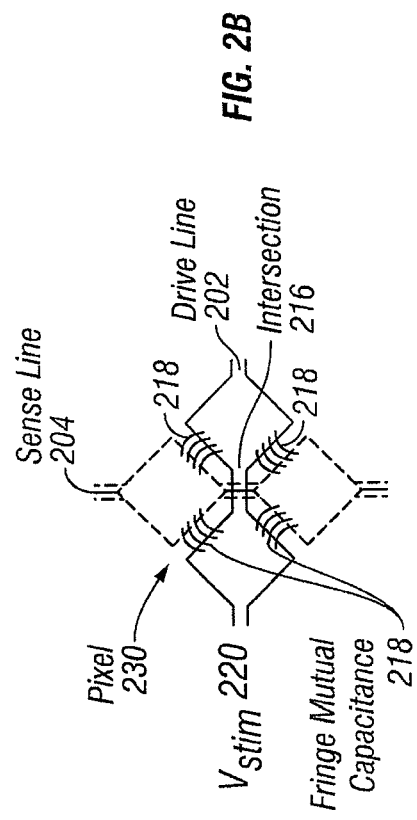
FIG. 2A
FIG. 2B

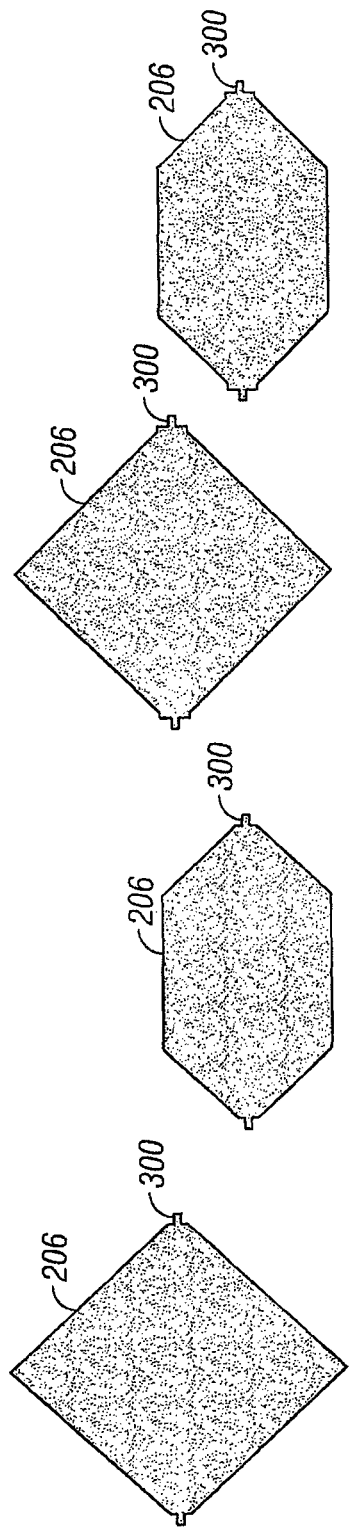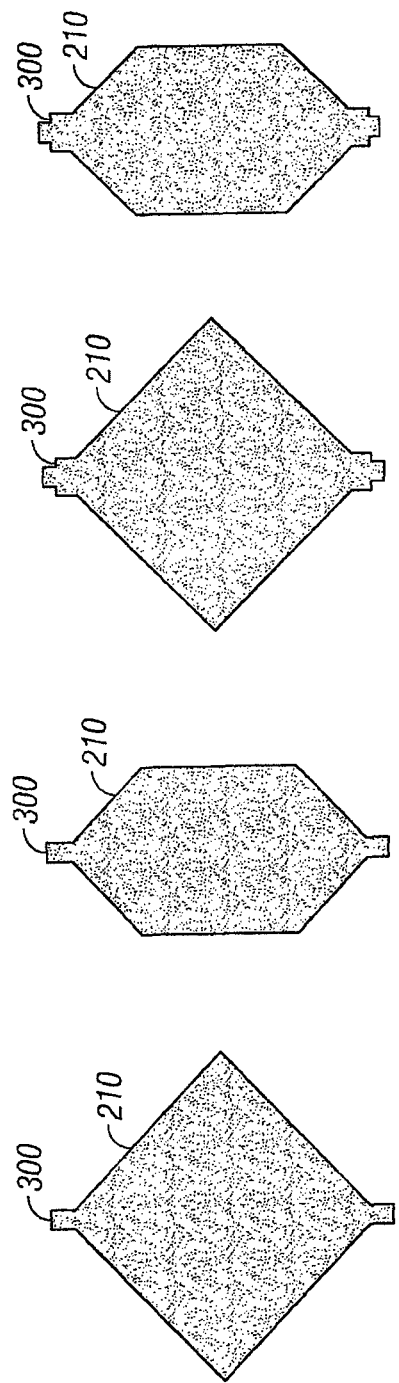
FIG. 3A  FIG. 3B  FIG. 3C  FIG. 3D

TOUCH SENSOR PANEL DESIGN

FIELD

This relates generally to touch sensor panels, and in particular, to touch sensor panel designs that can improve touch sensitivity and reduce negative optical artifacts.

BACKGROUND

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location dictated by a user interface (UI) being displayed by the display device. In general, touch screens can recognize a touch event and the position of the touch event on the touch sensor panel, and the computing system can then interpret the touch event in accordance with the display appearing at the time of the touch event, and thereafter can perform one or more actions based on the touch event.

Mutual capacitance touch sensor panels can be formed from a matrix of drive and sense lines of a substantially transparent conductive material such as Indium Tim Oxide (ITO), often arranged in rows and columns in horizontal and vertical directions on a substantially transparent substrate. Drive signals can be transmitted through the drive lines, which can result in the formation of static mutual capacitance at the crossover points (sensing pixels) of the drive lines and the sense lines. The static mutual capacitance, and any changes to the static mutual capacitance due to a touch event, can be determined from sense signals that can be generated in the sense lines due to the drive signals.

The touch sensing pixels can be varied in size and/or spacing to enable touch sensitivity in large panels without increasing the number of drive and sense lines which can otherwise increase the processing burden and can cause negative optical artifacts when viewing the display device through the touch panel. However, increasing the size and/or spacing of the touch sensing pixels can negatively impact the resistance and capacitance (RC) time constant per pixel, thereby hindering touch sensitivity of the touch panel and limiting the speed at which the touch panel can operate.

SUMMARY

This relates to a touch sensor panel including a plurality of shaped drive lines and a plurality of shaped sense lines formed on the same layer and utilizing conductive jumpers in crossover locations, according to one example. The plurality of drive lines and the plurality of sense lines can be formed by interconnecting sections of at least one conductive material having a truncated diamond shape to reduce parasitic capacitance, although other shapes can also be used. Either the sections of the plurality of drive lines or the sections of the plurality of sense lines can be interconnected with one or more conductive cross-overs, which can be an opaque metal or other conductive material. A black mask or other opaque covering can be layered over the one or more conductive cross-overs to minimize visual artifacts. Also, at least one conductive dummy region can be disposed in an area of the touch sensor panel around the truncated diamond shaped sections of the plurality of drive lines and the plurality of sense lines to improve optical uniformity and enhance the touch detection capabilities of the touch sensor panel. One or more metal lines can be formed overlapping and electrically connected to the interconnected sections of each of the plurality of drive lines and the plurality of sense lines in order to further reduce resistance.

In an alternate example, the plurality of drive lines and the plurality of sense lines can be formed by interconnecting sections of interconnected conductive lines. According to an example, the interconnected conductive lines are formed of sections of at least one conductive material having an interdigitated comb design. The sections can be formed from a substantially transparent conductive material such as ITO, for example. Alternatively, the interconnected conductive lines may be thin metal lines in a web-like formation, without the substantially transparent conductive material.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

FIG. 2(a) illustrates an exemplary arrangement of drive and sense lines on the same side of a single substrate according to various examples.

FIG. 2(b) illustrates an exemplary pixel generated from diamond-shaped drive and sense lines on the same side of a single substrate according to various examples.

FIG. 3(a) illustrates an exemplary diamond-shaped section with thin arms according to various examples.

FIG. 3(b) illustrates an exemplary truncated diamond-shaped section with thin arms according to various examples.

FIG. 3(c) illustrates an exemplary diamond-shaped section with thick arms according to various examples.

FIG. 3(d) illustrates an exemplary truncated diamond-shaped section with thick arms according to various examples.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates to the formation of touch sensor panels, and in some examples, larger-size touch sensor panels. A touch sensor panel, according to various examples, can include a plurality of drive lines crossing a plurality of sense lines, forming an array. The plurality of drive lines and the plurality of sense lines can be formed by interconnecting sections of at least one conductive material having a truncated diamond shape in order to reduce parasitic capacitance, although other shapes can also be used. At least one conductive dummy region can be disposed in an area of the touch sensor panel around the truncated diamond shape sections of the plurality of drive lines and the plurality of sense lines, in order to provide visual uniformity and to further reduce parasitic capacitance. One or more metal lines (or lines formed from other conductive material) may be formed overlapping and in electrical contact with the interconnected sections of each of the plurality of drive lines and the plurality of sense lines, in order to further reduce resistance.

In an alternate example, the plurality of drive lines and the plurality of sense lines can be formed by interconnecting sections of interconnected conductive lines. According to an example, the interconnected conductive lines are formed of sections of at least one conductive material having an interdigitated comb design. The sections can be formed from a substantially transparent conductive material such as ITO, for example. Alternatively, the interconnected conductive lines may be thin metal lines in a web-like formation, without the substantially transparent conductive material.

Although examples may be described and illustrated herein in terms of mutual capacitance touch sensor panels, it should be understood that the various examples are not so limited, but can be additionally applicable to self-capacitance sensor panels, single and multi-touch sensor panels, and other sensors in which multiple simultaneous stimulation signals are used to generate a composite sense signal. Furthermore, it should be understood that various examples are also applicable to various touch sensor panel configurations, such as configurations in which the drive and sense lines are formed in non-orthogonal arrangements, on the back of a cover glass, on the same side of a single substrate, or integrated with display circuitry.

Figure 1:
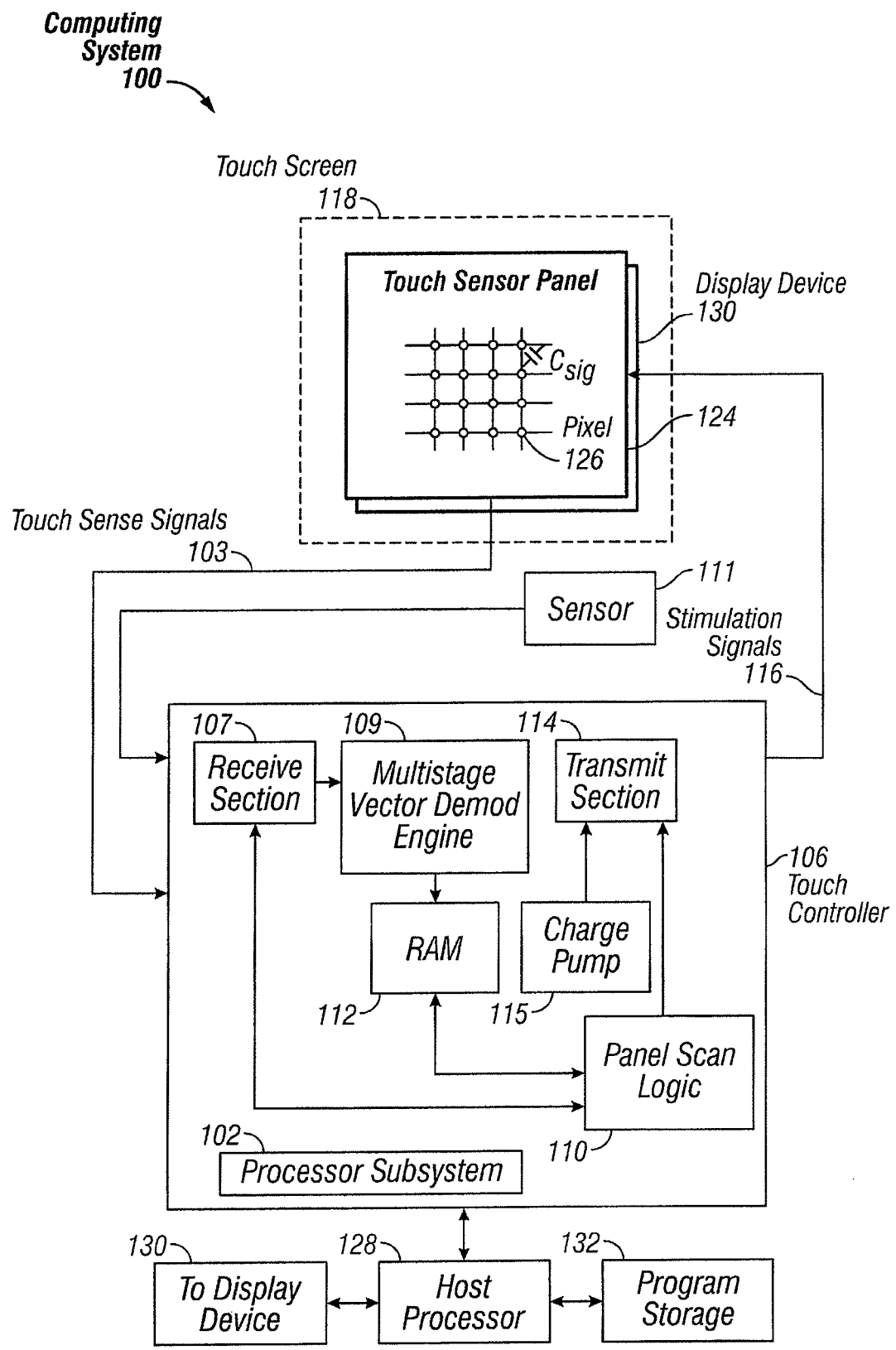
FIG. 1 illustrates an example computing system according to various examples.

FIG. 1 illustrates example computing system 100 that can utilize multi-touch controller 106 with integrated drive system according to various examples. Touch controller 106 can be a single application specific integrated circuit (ASIC) that can include one or more processor subsystems 102, which can include, for example, one or more main processors, such as ARM968 processors or other processors with similar functionality and capabilities. However, in other examples, the processor functionality can be implemented instead by dedicated logic, such as a state machine. Processor subsystems 102 can also include, for example, peripherals (not shown) such as random access memory (RAM) or other types of memory or storage, watchdog timers and the like. Touch controller 106 can also include, for example, receive section 107 for receiving signals, such as touch sense signals 103 from the sense lines of touch sensor panel 124, other signals from other sensors such as sensor 111, etc. Touch controller 106 can also include, for example, a demodulation section such as multistage vector demod engine 109, panel scan logic 110, and a drive system including, for example, transmit section 114. Panel scan logic 110 can access RAM 112, autonomously read data from the sense channels and provide control for the sense channels. In addition, panel scan logic 110 can control transmit section 114 to generate stimulation signals 116 at various frequencies and phases that can be selectively applied to the drive lines of touch sensor panel 124.

Charge pump 115 can be used to generate the supply voltage for the transmit section. Stimulation signals 116 (Vstim) can have amplitudes higher than the maximum voltage the ASIC process can tolerate by cascoding transistors. Therefore, using charge pump 115, the stimulus voltage can be higher (e.g. 6V) than the voltage level a single transistor can handle (e.g. 3.6 V). Although FIG. 1 shows charge pump 115 separate from transmit section 114, the charge pump can be part of the transmit section.

Touch sensor panel 124 can include a capacitive sensing medium having a plurality of drive lines and a plurality of sense lines. The drive and sense lines can be formed from a transparent conductive medium such as Indium Tin Oxide (ITO) or Antimony Tin Oxide (ATO), although other transparent and non-transparent materials such as copper can also be used. In some examples, the drive and sense lines can be perpendicular to each other, although in other examples other non-Cartesian orientations are possible. For example, in a polar coordinate system, the sensing lines can be concentric circles and the driving lines can be radially extending lines (or vice versa). It should be understood, therefore, that the terms "drive lines" and "sense lines" as used herein are intended to encompass not only orthogonal grids, but the intersecting traces of other geometric configurations having first and second dimensions (e.g. the concentric and radial lines of a polar-coordinate arrangement). The drive and sense lines can be formed on, for example, a single side of a substantially transparent substrate.

At the "intersections" of the traces, where the drive and sense lines can pass adjacent to and above and below (cross) each other (but without making direct electrical contact with each other), the drive and sense lines can essentially form two electrodes (although more than two traces could intersect as well). Each intersection of drive and sense lines can represent a capacitive sensing node and can be viewed as picture element (pixel) 126, which can be particularly useful when touch sensor panel 124 is viewed as capturing an "image" of touch. (In other words, after touch controller 106 has determined whether a touch event has been detected at each touch sensor in the touch sensor panel, the pattern of touch sensors in the multi-touch panel at which a touch event occurred can be viewed as an "image" of touch (e.g. a pattern of fingers touching the panel).) The capacitance between drive and sense electrodes can appear as a stray capacitance when the given row is held at direct current (DC) voltage levels and as a mutual signal capacitance Csig when the given row is stimulated with an alternating current (AC) signal. The presence of a finger or other object near or on the touch sensor panel can be detected by measuring changes to a signal charge Qsig present at the pixels being touched, which is a function of Csig.

Computing system 100 can also include host processor 128 for receiving outputs from processor subsystems 102 and performing actions based on the outputs that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 128 can also perform additional functions that may not be related to panel processing, and can be coupled to program storage 132 and display device 130 such as an LCD display for providing a UI to a user of the device. In some examples, host processor 128 can be a separate component from touch controller 106, as shown. In other examples, host processor 128 can be included as part of touch controller 106. In still other examples, the functions of host processor 128 can be performed by processor subsystem 102 and/or distributed among other components of touch controller 106. Display device 130 together with touch sensor panel 124, when located partially or entirely under the touch sensor panel, can form touch screen 118.

Note that one or more of the functions described above can be performed, for example, by firmware stored in memory (e.g., one of the peripherals) and executed by processor subsystem 102, or stored in program storage 132 and executed by host processor 128. The firmware can also be stored and/or transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain or store the program for use by or in connection with the instruction execution system, apparatus, or device. The computer readable medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

According to an example of the present disclosure, the drive and sense lines of touch sensor panel 124 may be formed of diamond-shaped or truncated diamond-shaped sections of ITO, for example, that are interconnected. FIG. 2a illustrates exemplary arrangement 200 of diamond-shaped drive and sense lines on the same layer and side of a single substrate. Note that the spatial density of pixels in the arrangement can be made similar to previously disclosed sensor panels, as spatial density can be dependent on the geometry of the diamond-shaped drive and sense lines. Note also that FIG. 2a shows diamond-shaped drive lines 202 and diamond-shaped sense lines 204 separately and superimposed at 200; however, drive lines 202 and sense lines 204 can be disposed on the same layer. In FIG. 2a, each drive line 202 can be formed from areas of substantially transparent ITO 206 ("sections" 206) connected at adjacent facing points by necked-down area 208, although conductive material other than ITO can also be used. Each sense line 204 can be similarly formed from areas of substantially transparent ITO 210 ("sections" 210) or other conductive material connected at adjacent facing points by interconnect area 212 (described in greater detail below), which "jump over" the interconnected drive lines sections 206 at necked-down area 208. Sense lines 204 can be connected to a pre-amplifier held at a virtual ground of, for example, 1.5V, and one or more drive lines 202 can be stimulated with the others held at direct current (DC) voltage levels.

FIG. 2b illustrates exemplary pixel 230 generated from diamond-shaped drive lines 202 and sense lines 204 on the same side of a single substrate according to various examples. If drive lines 202 is stimulated with a stimulation signal Vstim 220, a static mutual capacitance can be formed at intersection 216 of the necked-down areas. The static mutual capacitance at intersection 216 can be undesirable because a finger may not be able to block many of the fringing fields. Accordingly, in this example the necked-down areas are made as small as possible; however, alternate arm designs of the diamond sections are described below with reference to other examples.

A fringe mutual capacitance 218 can also be formed between the diamonds in the stimulated drive lines and the adjacent sense line diamonds. Fringe mutual capacitance 218 between adjacent diamonds can be of roughly the same order as the mutual capacitance formed between drive and sense lines separated by a substrate. Fringe mutual capacitance 218 between adjacent row and column diamonds can be desirable because a finger or other object may be able to block some of the fringing electric field lines and effect a change in the mutual capacitance that can be detected by the analog channels connected to the rows. As shown in FIG. 2b, there can be four "hot spots" of fringing mutual capacitance indicated at 218 that can be blocked by a finger or other object, and the more that a finger blocks, the greater the change in the mutual capacitance.

FIGS. 3(a)-3(d) show exemplary ITO section architectures of drive lines sections 206 and sense line sections 210 that may be interconnected to form drive lines 202 and/or sense lines 204, although it should be understood that conductive materials other than ITO may also be used. Each section may include a variable size arm 300, which can connect to another arm 300 of an adjoining section or may be electrically connected to interconnect 212, which in turn can be connected to arm 300 of another sense line section 210, for example (e.g., to form sense line 204).

As shown in FIGS. 3(a)-3(d), drive line sections 206 and sense line sections 210 may be truncated (as shown in FIGS. 3(b) and 3(d)), which can reduce parasitic capacitance therein. In general, reducing the surface area of a section at its widest point (e.g., chopping off the corners of the diamond) where the sheet resistance in Ohms per square is lowest can reduce parasitic mutual capacitance without significantly increasing the overall resistance of the section. In addition, through RC time constant simulations, it has been determined that increasing the width of arm 300 as much as possible, with the truncated diamond shape of the drive lines sections 206 and sense line sections 210, can increase conductance C, thus reducing resistance R, as compared to narrower arms 300 with the truncated diamond shape (i.e., FIG. 3(b)). Resistance R simulations of the sections provided in FIGS. 3(a)-(d) are shown in Table 1 below:

TABLE 1

|  | FIG. 3(a) | | FIG. 3(b) | | FIG. 3(c) | | FIG. 3(d) | |
| --- | --- | --- | --- | --- | --- | --- | --- | --- |
|  | Rx | Ry | Rx | Ry | Rx | Ry | Rx | Ry |
| R (Ohms) | 541 | 832 | 576 | 868 | 482 | 556 | 517 | 593 |
| R/pitch (Ohms/mm) | 99 | 144 | 105 | 150 | 88 | 97 | 95 | 103 |

Thus, using a section 206/210 design as shown in FIG. 3(d), for example, parasitic capacitance may be reduced without a significant increase in resistances Rx and Ry.

Figure 4:
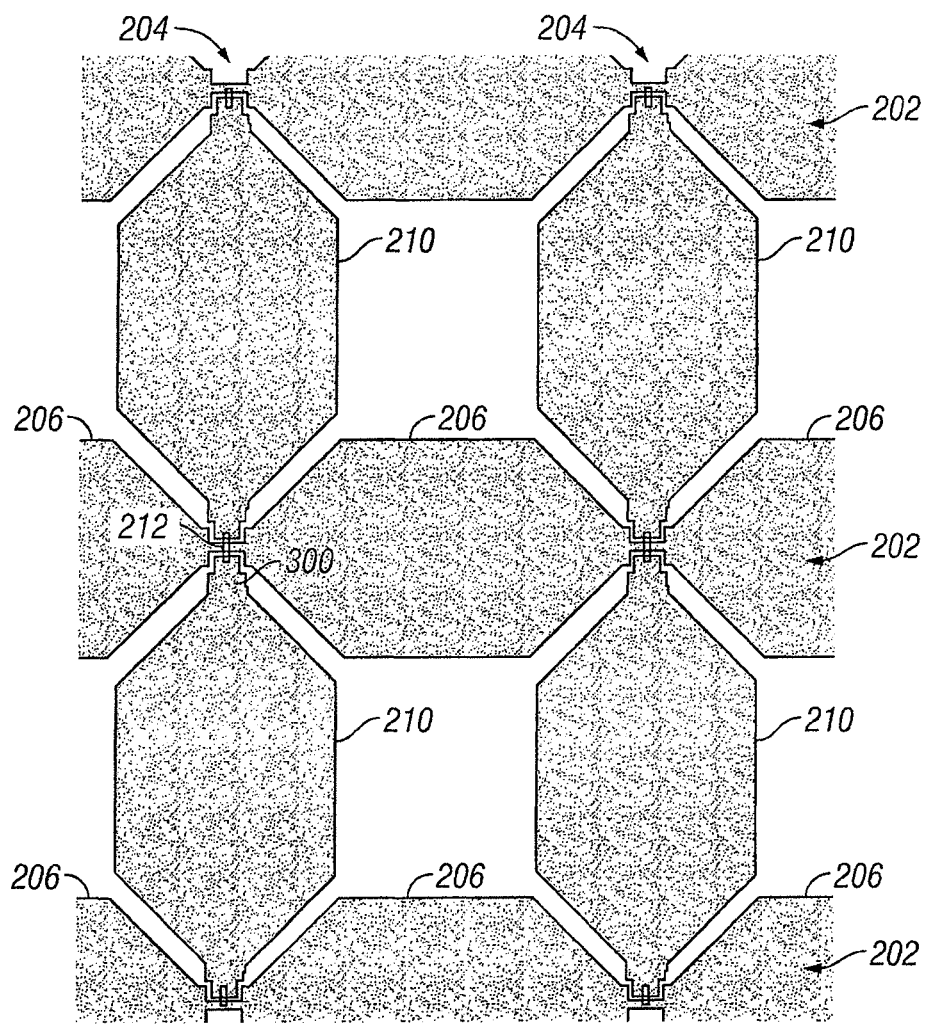
FIG. 4 illustrates an exemplary array of interconnected truncated diamond-shaped sections according to various examples.

FIG. 4 shows an exemplary array of drive lines 202 and sense lines 204 formed of interconnected sections 206/210 as shown in FIG. 3(d), according to various examples. Drive lines 202 can be formed from connected truncated diamond-shaped sections 206. Sense lines 204 can be formed by interconnecting truncated diamond-shaped sections 210 using interconnects 212, for example, which can connect individual sections 210 by crossing or jumping over sections 206 at their connection point. That is, interconnects 212 can connect individual sections 210 over or under the connection point of sections 206. Interconnects 212 may be any conductive material, such as an opaque metal or ITO.

Figure 5A:
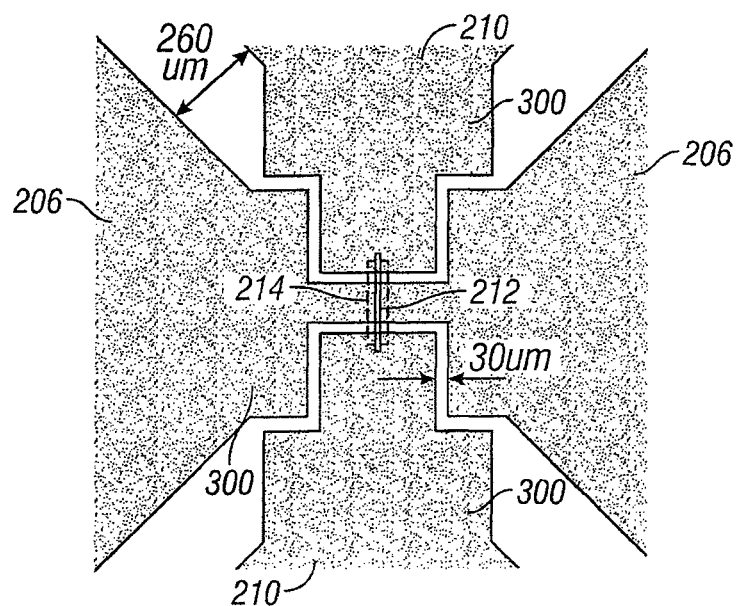
FIG. 5(a) illustrates a close-up view of interconnected truncated diamond-shaped sections according to various examples.
Figure 5B:
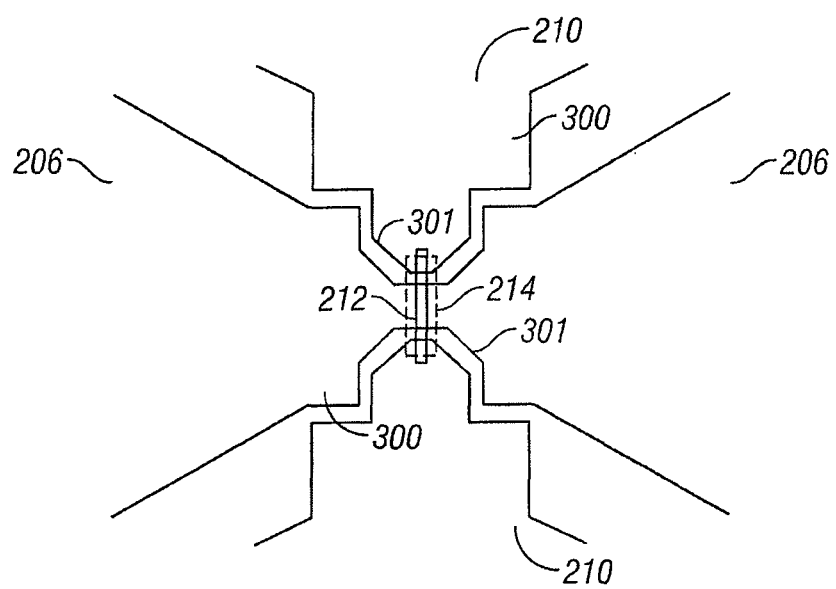
FIG. 5(b) illustrates a close-up view of interconnected truncated diamond-shaped sections with angled arms according to various examples FIG. 6 an exemplary array of interconnected truncated diamond-shaped sections and dummy sections according to various examples.

FIG. 5(a) is a close-up view of the connections of drive line sections 206 and sense line sections 210, using interconnects 212. Before interconnect 212 is formed, insulating material 214 can be applied over the conductive material (e.g., ITO) layer forming drive and sense lines 206 and 210. Interconnect 212, which can be made of metal or other conductive material, can then be applied over insulating material 214, extending beyond the insulating material to short together sense line sections 210. In alternative examples, the process of forming the ITO layer, insulating layer, and metal layer can be reversed, with the metal layer deposited first. In either example, an optional layer of black mask (or other nonreflective material) can be applied over interconnect 212 to reduce negative visual artifacts. As can be seen in FIG. 5(a), arms 300 can be made as wide as possible in order to increase capacitance C, thus reducing resistances Rx and Ry. Arms 300 shown in FIG. 5(a) are merely exemplary arm 300 designs, and variations of arms 300 can be employed without departing from the scope of the present disclosure. For example, in one alternative example, the narrowest arm portion of sections 210, along with the necked-down areas between sections 206, can be formed in an angled manner at sides 301 as shown in FIG. 5b to lower the overall resistance of the sense line sections 210. According to an example, the portion of arm 300 that is interconnecting to another arm 300 can be as narrow as possible, while each arm 300 increases in width as much as possible from the point of interconnecting in order to decrease resistance.

Figure 6:
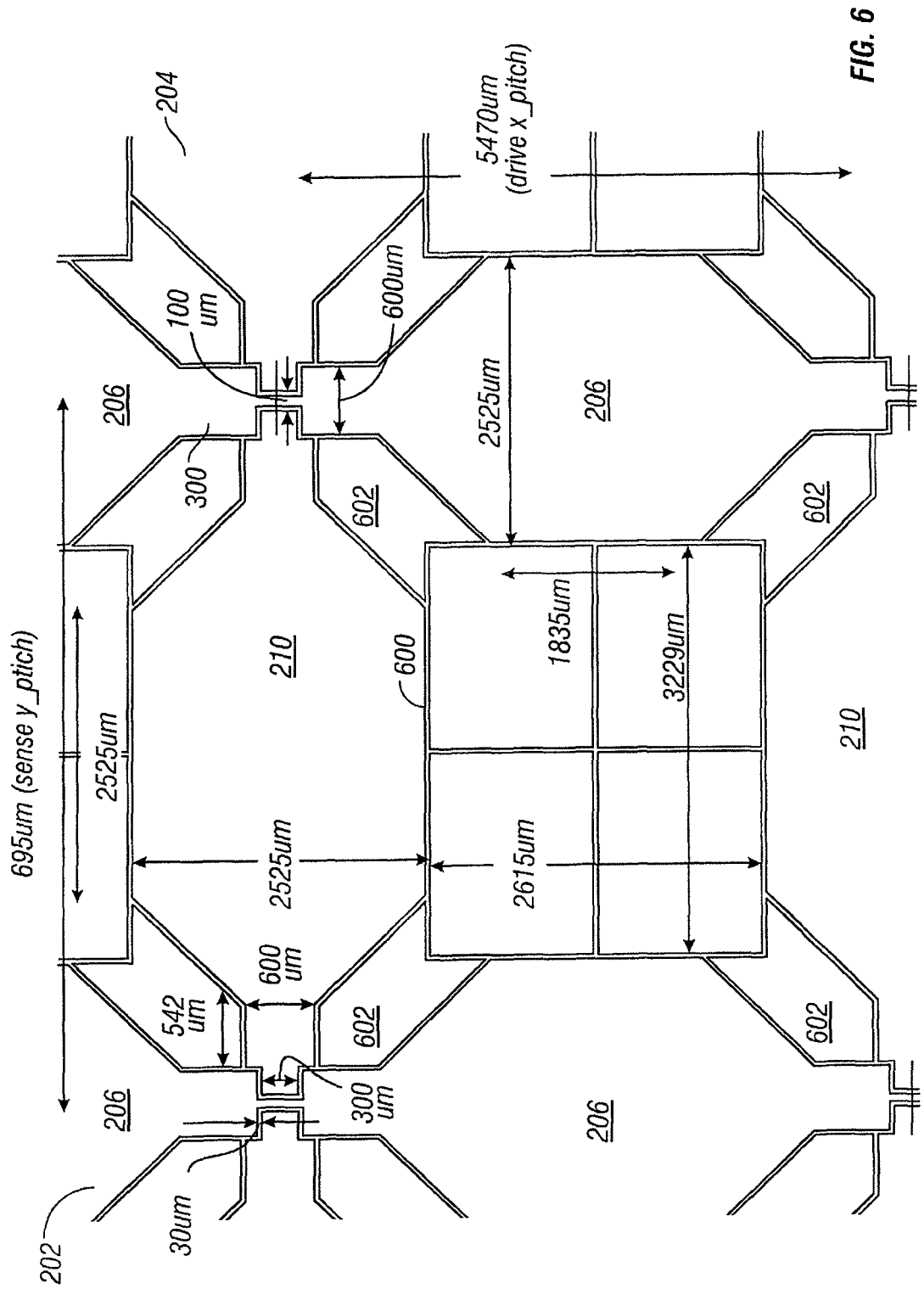

Isolated "dummy" sections can be formed between drive lines 202 and sense lines 204 according to various examples. FIG. 6 shows an exemplary array of drive lines 202 and sense lines 204 formed of interconnected sections 206/210 as shown in FIG. 3(d), in which dummy sections 600 and 602 are formed there between, according to various examples. In particular, generally rectangular dummy sections 600 of the same composition (e.g., ITO) as sections 206 and 210 can be formed between drive lines 202 and sense lines 204 on the same layer as drive lines 202 and sense lines 204. In addition, generally arrow-shaped diagonal dummy sections 602 of the same composition (e.g., ITO) as sections 206 and 210 can be formed between drive lines 202 and sense lines 204 on the same layer as the drive and sense lines. Because of dummy sections 600, almost all areas of the substrate can be covered (i.e. substantially covered) with the same material, providing optical uniformity. In FIG. 6, repeating patterns of four isolated dummy sections 600 and four isolated dummy sections 602 are illustrated for exemplary purposes; however, one of skill in the art would realize that any number of dummy sections 600 and 602 of any number of shapes may be formed on the substrate between drive lines 202 and sense lines 204.

A large parasitic mutual capacitance can be formed between stimulated drive line 202, for example, and dummy sections 600 and 602, but because dummy sections 600 and 602 are isolated, their voltage potential can move along with stimulated drive line 202 and can have minimal or no negative impact on touch detection. Reducing the size of each dummy section 600 and 602 in a particular area, thus increasing the number of dummy sections 600 and 602, can further reduce parasitic mutual capacitance.

Dummy sections 602 can also have a beneficial impact on touch detection. Because drive lines 202 and sense lines 204 can be formed on the same layer on the same side of a substrate, a large static mutual capacitance can be created between them. However, only a relatively small number of the electric field lines between drive lines 202 and sense lines 204 (those that extend beyond the cover of the touch sensor panel) are capable of being influenced by a finger or other object. Most of the electric field lines remain within the confines of the cover and are generally unaffected by a touch event. Therefore, a touch event may only cause a small change in the large static mutual capacitance, making it difficult to detect the touch event. However, with dummy sections 602 in place, instead of having static mutual capacitance form between drive lines 202 and sense lines 204 within the confines of the cover, parasitic mutual capacitance will instead be formed between the drive lines 202 and the dummy sections 602. Removal of static mutual capacitance unaffected by a touch event can improve the touch detection capabilities of the panel, because a higher percentage of the remaining static mutual capacitance can be influenced by a touch event.

FIG. 6 also provides exemplary measurements for sections 206 and 210, arms 300, dummy sections 600 and empty space there between. However, it is noted that these measurements are merely used for exemplary purposes and are not intended to limit the sizes or dimensions of components of the touch sensor display.

Figure 7:
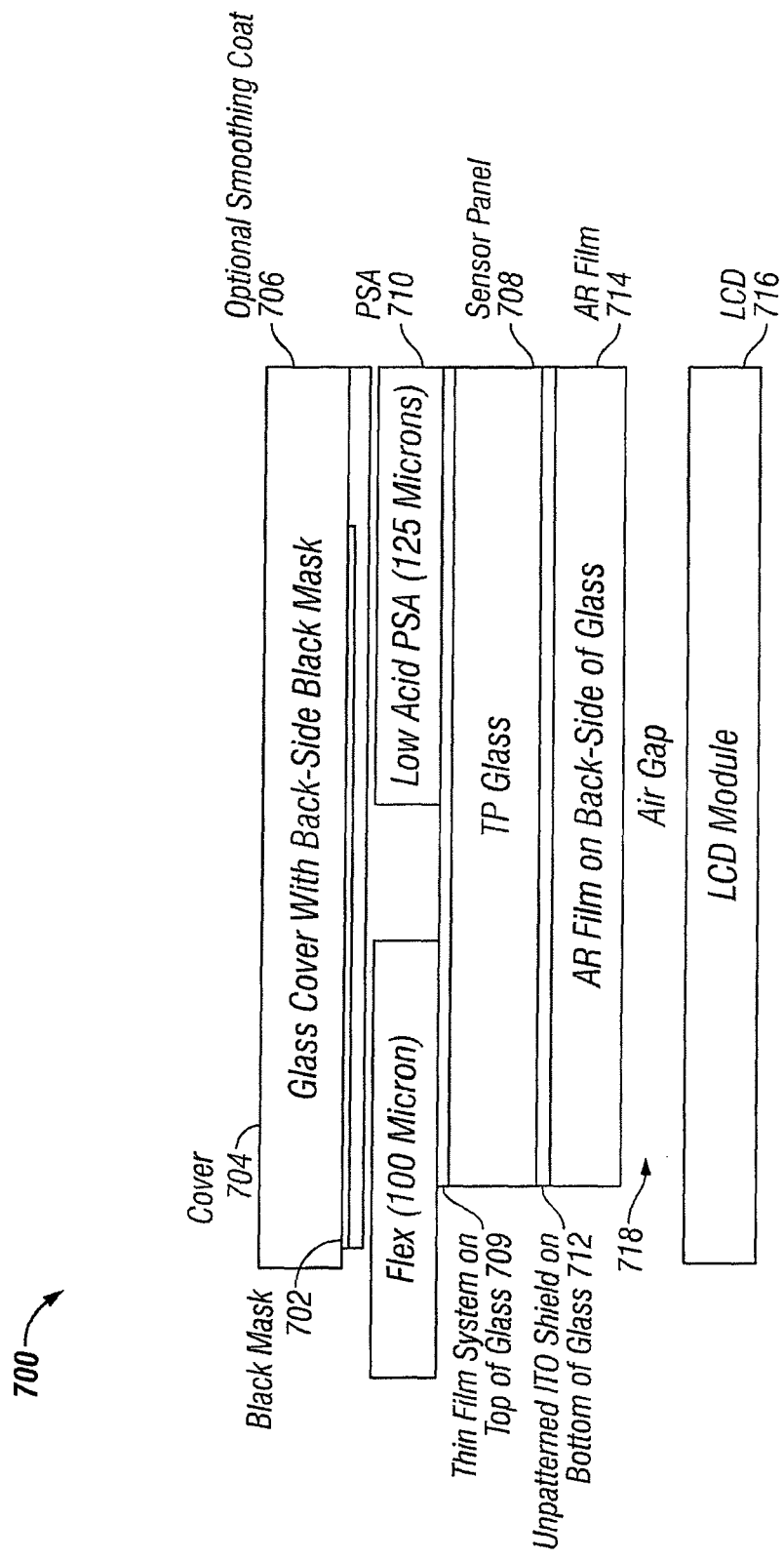
FIG. 7 illustrates exemplary touch screen stackup according to various examples.

FIG. 7 illustrates an exemplary touch screen stackup 700 according to various examples. It should be understood, however, that the various touch pixel examples disclosed herein can also be implemented in other configurations including, but not limited to, on the back side of a cover glass, the back side of the touch panel (TP) glass, or integrated within a display module (e.g., OLED or LCD). In FIG. 7, black mask (or a mask of any color) 702 can be formed on a portion of the back side of cover 704, and an optional smoothing coat 706 can be applied over the black mask and back side of the cover. According to certain examples, the black mask may be formed to cover the metal interconnects 212 interconnecting the ITO truncated diamond-shaped sections 210, for example. Accordingly, visual artifacts caused by light reflecting from the metal interconnects 212 may be mitigated. Touch panel 708 of the type described above, with drive lines, sense lines, insulating material and metal jumper (at area 709 in FIG. 7) formed on the same layer on the same side of a glass substrate, can be bonded to the cover with pressure sensitive adhesive (PSA) 710. An unpatterned layer of ITO 712 can optionally be formed on the bottom of the glass to act as a shield. Anti-reflective film 714 can then be deposited over unpatterned ITO 712. LCD module 716 can then be placed beneath the glass substrate, optionally separated by air gap 718 for ease of repair.

Figure 8A:
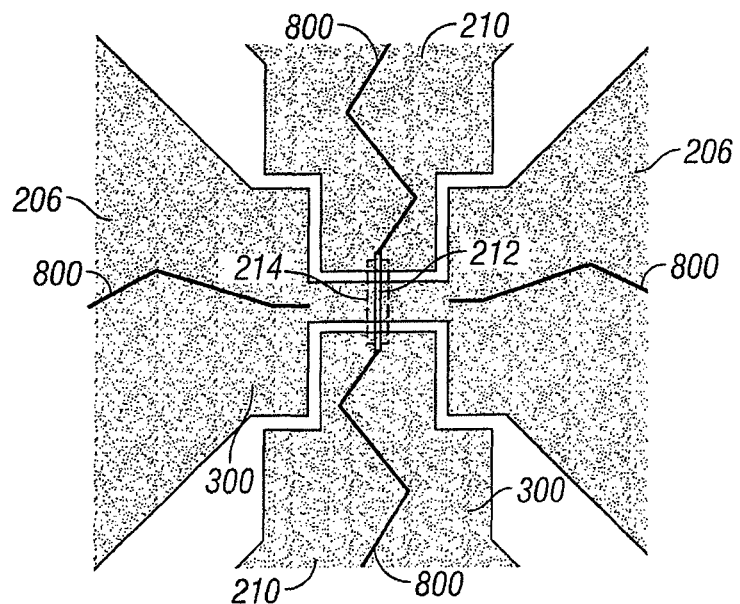
FIG. 8(a) illustrates a close-up view of interconnected truncated diamond-shaped sections with zigzagged metal traces according to various examples.

FIG. 8(a) illustrates an example in which truncated diamond-shaped sections 206 and 210 are interconnected as described above with reference to FIG. 5. However, in the example depicted in FIG. 8(a), metal lines (or traces) 800 (or lines of other conductive material) are electrically connected substantially in parallel to at least one drive line 202 and/or sense line 204. Metal traces 800 can be formed on the same layer and from the same material as interconnect 212. Metal traces 800 electrically connected to sense line sections 210 can be directly connected to interconnect 212, while in some examples metal traces 800 electrically connected to drive line sections 206 can be terminated at the end of arm area 300 as shown in FIG. 8(a). However, in other examples, metal traces 800 electrically connected to drive line sections 206 can be connected together in an unbroken fashion, separated from interconnect 212 by insulating material 214. The metal traces 800 can have a significantly lower resistance as compared to the ITO sections 206 and 210 (ITO sheet resistance may be ~140 Ohms, while metal sheet resistance may be ~0.3 Ohms). Thus, adding the lower-resistance metal traces 800 can result in a lower resistance drive lines 202 and sense lines 204.

Figure 8B:
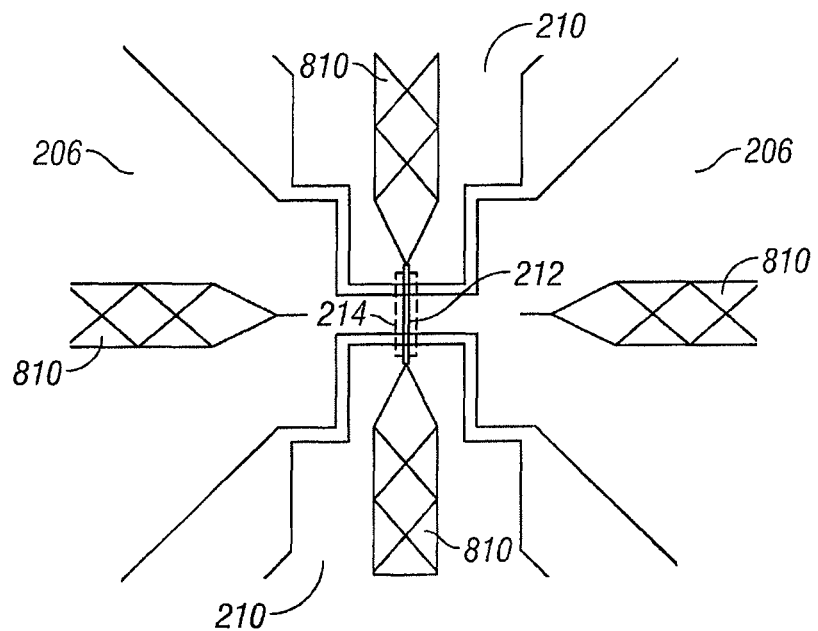
FIG. 8(b) illustrates a close-up view of interconnected truncated diamond-shaped sections with a conductive pattern on each section according to various examples.
Figure 8C:
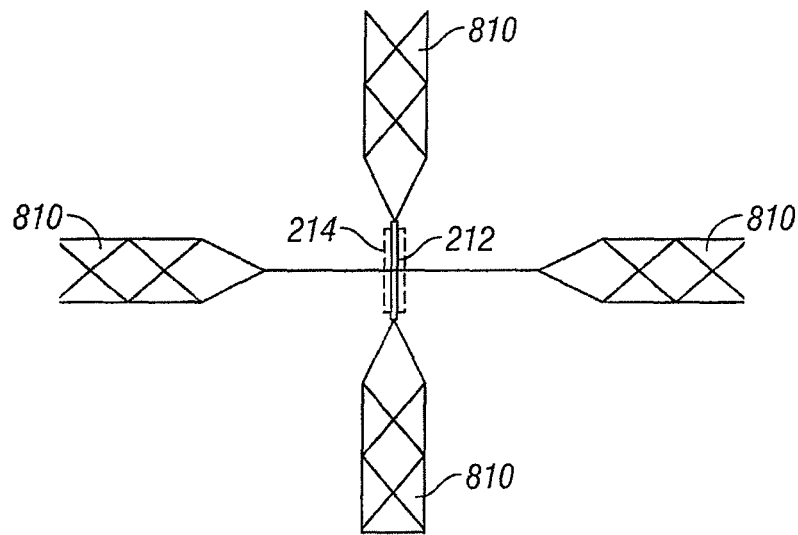
FIG. 8(c) illustrates a close-up view of interconnected patterns without truncated diamond-shaped sections according to various examples.

In the depicted example, the metal traces are zigzagged in order to minimize visual artifacts when viewing the LCD, for example, through the touch panel sensor 124. The zigzag pattern can avoid Moiré or other negative visual effects that can result from the metal traces being in alignment with the LCD structures. Alternatively, the pattern can be designed to be aligned over the black mask areas of the LCD to minimize blocking of the displayed image. However, the traces 800 may be straight or in any zigzag pattern without departing from the scope of the present disclosure. The metal traces 800 can be connected to metal interconnect 212, according to an example. The metal traces 800 may be connected or disconnected between sections 206, for example. In addition, although FIG. 8(a) only shows a single metal line 800 for each section 206 or 210, in other examples any interconnected conductive pattern 810, made up of one or more traces of one or more conductive materials) may be formed in electrical contact with each of the sections to lower the resistance of those sections, as shown in FIG. 8(b). In some examples, these patterns 810 can be made uniform to minimize the negative visual artifacts created by the addition of the metal traces. In still further examples, sections 206 and 210 can be entirely replaced by interconnected conductive patterns 810, as shown in FIG. 8(c).

Figure 8D:
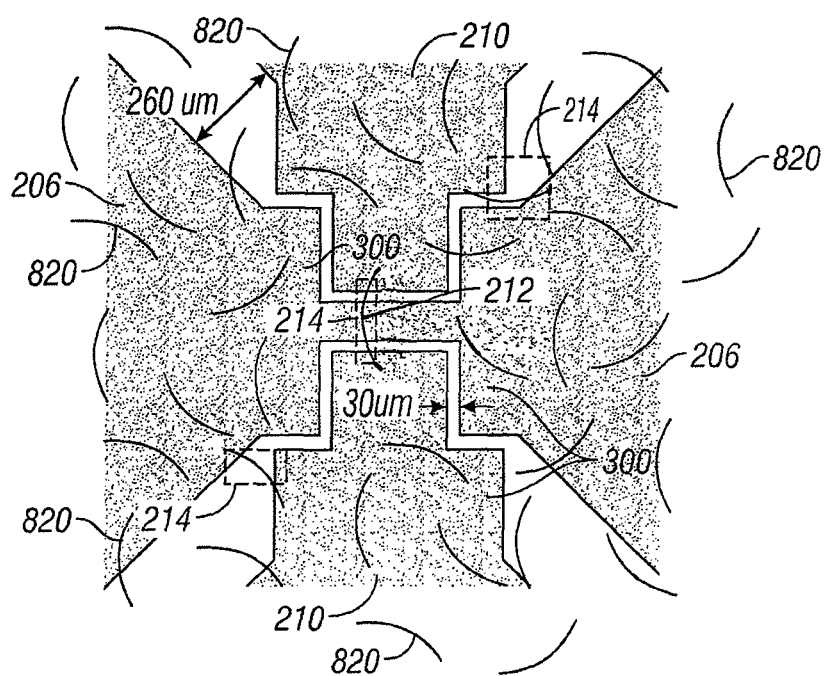
FIG. 8(d) illustrates a close-up view of interconnected truncated diamond-shaped sections with disjointed conductive patterns on each section according to various examples.

It is noted that the multiple conductive patterns 810 are not limited to any particular pattern 810, and one of skill in the art would realize that various patterns 810 can be formed within the scope of the present disclosure. For example, FIG. 8(d) shows an example where disjointed conductive patterns 820 are disposed in one or more random orientations. Disjointed conductive patterns 820 provide lower resistance drive lines 202 and sense lines 204, as well as being optically uniform at a distance, to make the disjointed conductive patterns 820 less visible. Any number of disjointed conductive patterns 820 can be included, and various different disjointed conductive patterns 820 may be formed in each of drive lines 202 and sense lines 204. While the example depicted in FIG. 8(a) can optimize conductance (potentially better than the example of FIG. 8(d)) wire visibility can be reduced with disjointed conductive patterns 820, as in FIG. 8(d). Referring to FIG. 8(d), insulating material 214 can be included (as described above) when the conductive patterns 820 happen to fall where they cross between sections 206 and/or 210, in order to avoid shorting between sections 206 and/or 210. Of course, all or portions of each of the examples of FIGS. 8(a)-8(d) may be used alone or in combination without departing from the scope of the present disclosure.

In an alternate example, the entire array of drive lines 202 and sense lines 204 can be rotated a predetermined amount (e.g., 15, 30 or 60 degrees) relative to the display module 716, for example, in order to minimize visual artifacts caused by the metal lines 800.

Figure 9:
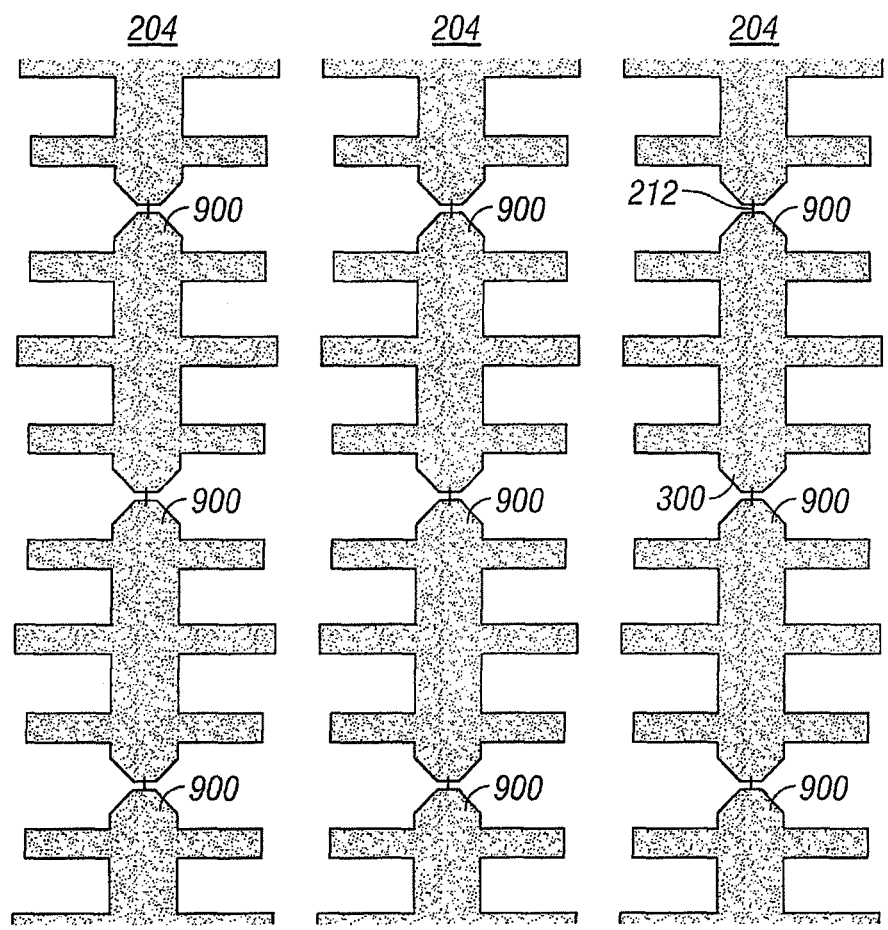
FIG. 9 illustrates exemplary columns of interdigitated comb design sections according to various examples.
Figure 10:
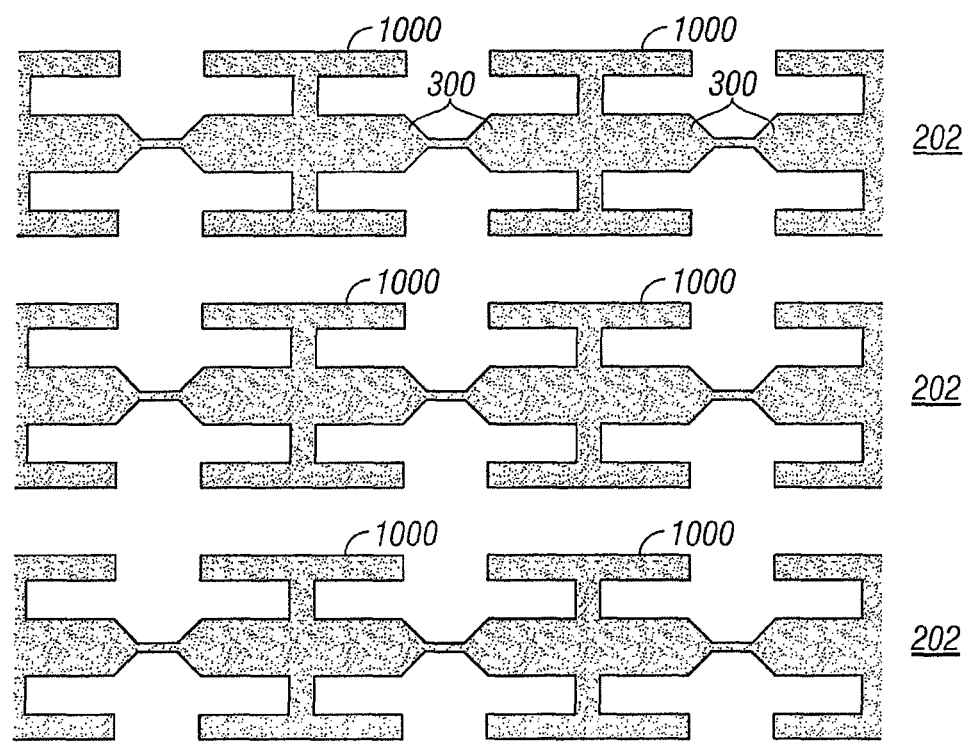
FIG. 10 illustrates exemplary drive lines of interdigitated comb design sections according to various examples.
Figure 11:
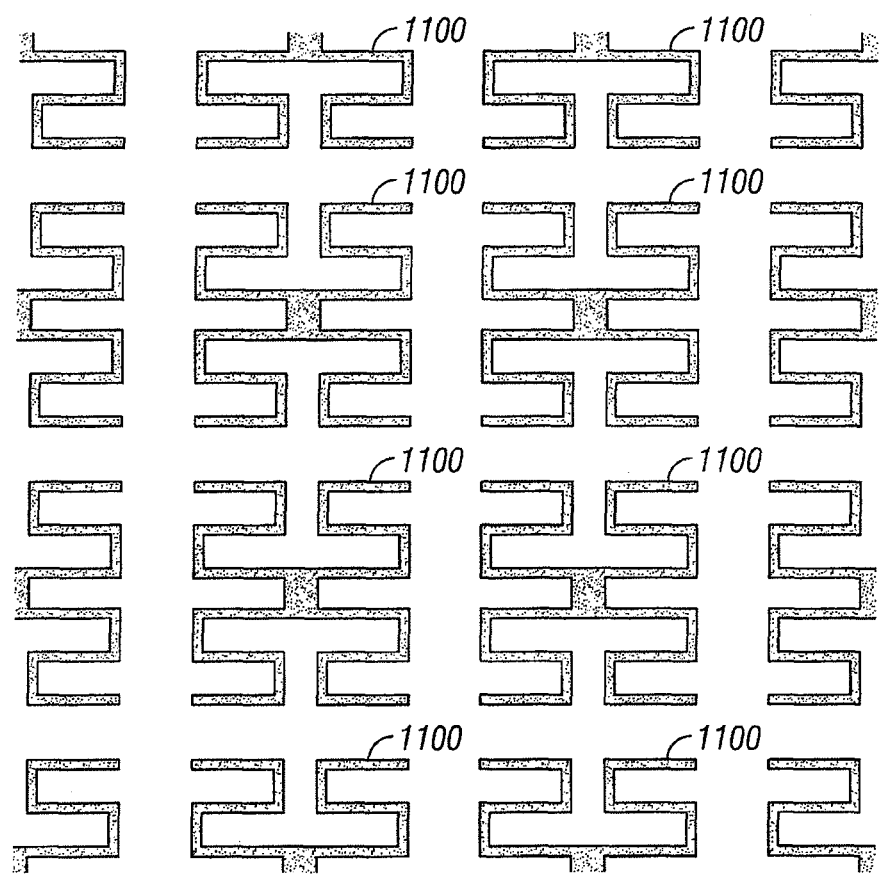
FIG. 11 illustrates exemplary dummy sections according to various examples.

Alternative designs for sections 206 and 210 and dummy sections can be used in order to maintain touch sensitivity while minimizing negative visual artifacts. FIGS. 9-11 respectively show exemplary columns 204, rows 202 and dummy sections 1100 that may be combined to form a touch sensor panel, according to an example. Of course, it is noted that the rows 202, columns 204 and dummy sections 1100 can be formed during a single deposition and patterning step, while interconnects 212 can be formed separately (either before or after the single deposition and patterning step). FIG. 9 shows an example of interdigitated comb design sections 900 interconnected by interconnects 212 to form sense lines 204. The example depicted in FIG. 9 shows sections 900 with three extending digits on either side of each section 900. However, three extending digits are merely depicted as an example, and any number or size of extending portions can be used.

FIG. 10 depicts an example of interdigitated comb design sections 1000 to form drive lines 202. This particular shape of sections 1000 can be chosen because of its correspondence with the chosen comb design of sections 900 in sense lines 204 of FIG. 9; however, one of ordinary skill in the art would realize that various designs of sections 900 in combination with sections 1000 can be used. It should be understood that the interlocking extending digits of sections 900 and 1000 can result in an increased amount of static mutual capacitance and increased touch detection capabilities.

Sections 900 and 1000 can be formed of a substantially transparent conductive material, such as ITO. Alternatively, sections 900 and/or 1000 can be made up of thin opaque metal lines in an interconnected web design to form rows 202 and columns 204. The web design of sections 900 and/or 1000 can include any number of digits disposed in various directions, and each digit can include any number of sub-digits branching therefrom.

FIG. 11 shows an example array of dummy sections 1100, which can be disposed in the empty area of the substrate 708 that is not covered by sections 900 and 1000. As noted above, dummy sections 1100 can be formed of the same conductive material as sections 900 and 1000 (e.g., ITO), and provide uniformity on the substrate, thereby reducing visual artifacts and parasitic capacitance. Dummy sections 1100 can also improve the touch detection capabilities of the panel by eliminating static mutual capacitance that is incapable of being influenced by a touch event.

Figure 12:
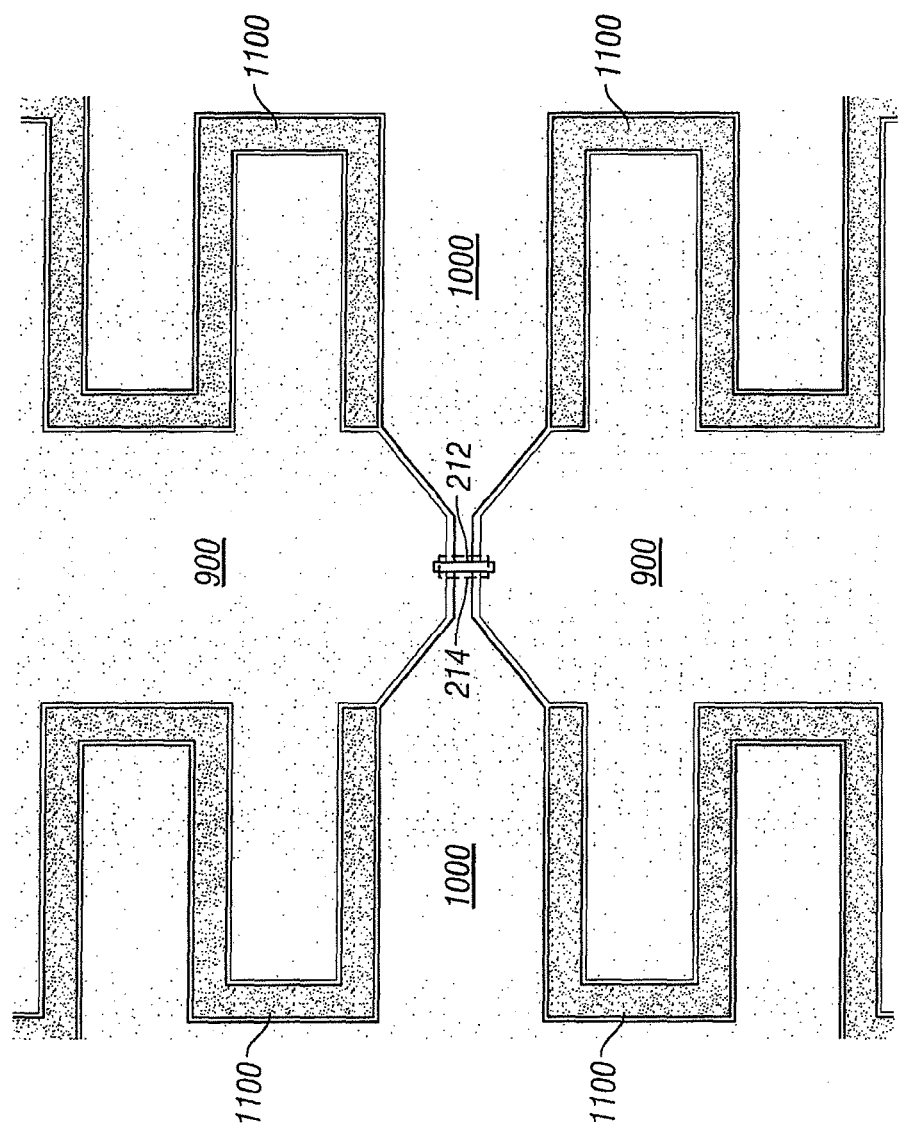
FIG. 12 illustrates a close-up view of connected interdigitated comb sections and dummy sections according to various examples.

FIG. 12 is a close-up view of interconnected row sections 1000, as well as column sections 900 interconnected using an insulator 214 and metal interconnect 212. As shown in FIG. 12, dummy sections 1100 can substantially fill the empty space between sections 900 and 1000.

Figure 13A:
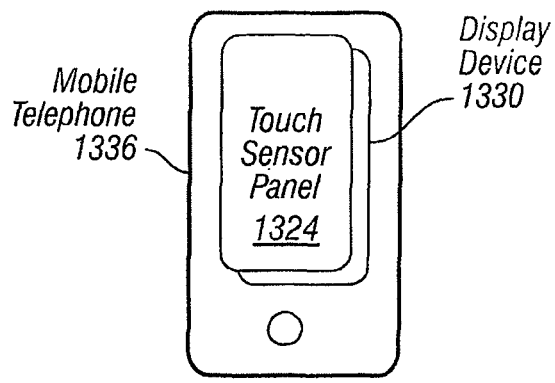
FIG. 13(a) illustrates an exemplary mobile telephone that can include a touch sensor panel according to the various examples described herein.

FIG. 13(a) illustrates an example mobile telephone 1336 that can include touch sensor panel 1324 and display device 1330, the touch sensor panel including a touch pixel design according to one of the various examples described herein.

Figure 13B:
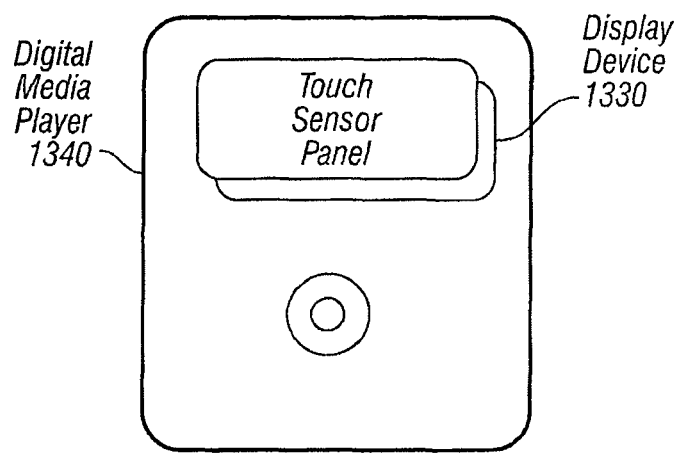
FIG. 13(b) illustrates an exemplary digital media player that can include a touch sensor panel according to the various examples described herein.

FIG. 13(b) illustrates an example digital media player 1340 that can include touch sensor panel 1324 and display device 1330, the touch sensor panel including a touch pixel design according to one of the various examples described herein.

Figure 13C:
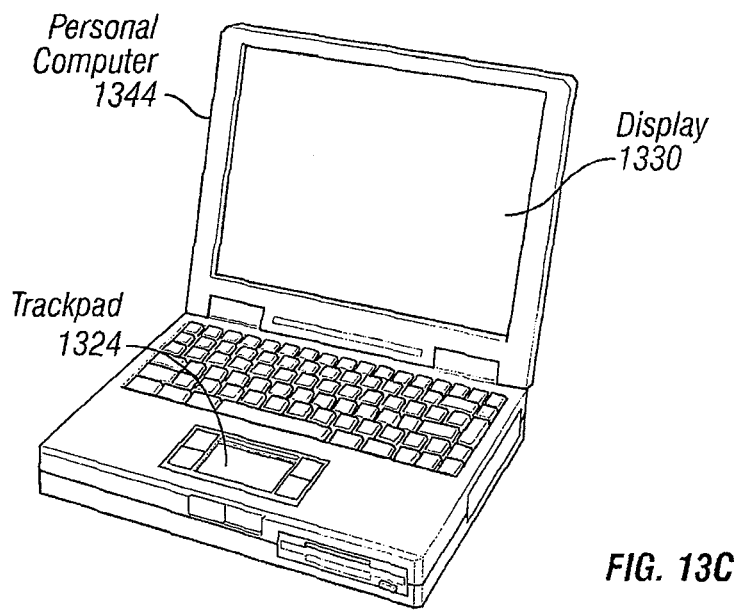
FIG. 13(c) illustrates exemplary personal computer that can include a touch sensor panel according to the various examples described herein

FIG. 13(c) illustrates an example personal computer 1344 that can include touch sensor panel (trackpad) 1324 and display 1330, the touch sensor panel and/or display of the personal computer (in examples where the display is part of a touch screen) including a touch pixel design according to the various examples described herein.

While various examples have been described above, it should be understood that they have been presented by way of example only, and not by way of limitation. Likewise, the various diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations. Additionally, although the disclosure is described above in terms of various examples and implementations, it should be understood that the various features and functionality described in one or more of the individual examples are not limited in their applicability to the particular example with which they are described. They instead can be applied alone or in some combination, to one or more of the other examples of the disclosure, whether or not such examples are described, and whether or not such features are presented as being a part of a described example. Thus the breadth and scope of the present disclosure should not be limited by any of the above-described examples.

What is claimed is:

1. A touch sensor panel, comprising: a plurality of first lines of a first conductive material; a plurality of second line sections of the first conductive material formed on a same layer as the plurality of first lines; a plurality of interconnect sections of a second conductive material configured for connecting second line sections together to form a plurality of second lines, and enabling the plurality of first and second lines to cross over each other to form an array of touch sensors; and one or more dummy regions disposed in an area around at least one of the plurality of first lines and the plurality of second lines, wherein the one or more dummy regions are formed on the same layer as the plurality of first lines and the plurality of second line sections.

2. The touch sensor panel of claim 1, wherein the one or more dummy regions are formed of the first conductive material.

3. The touch sensor panel of claim 1, wherein the one or more dummy areas are configured such that the dummy areas and the plurality of first and second lines are electrically isolated from one another and occupy substantially a full area of a substrate.

4. The touch sensor panel of claim 1, wherein the one or more dummy regions are formed of one or more repeating patterns of isolated sections.

5. The touch sensor panel of claim 1, wherein at least two of the second line sections have narrowed arms, and wherein an interconnect section connects the two second line sections together at their narrowed arms.

6. The touch sensor panel of claim 1, wherein the touch sensor panel is incorporated within a computing system.

7. The touch sensor panel of claim 1, wherein the computing system is incorporated into a mobile telephone.

8. The touch sensor panel of claim 1, wherein the computing system is incorporated into a media player.

9. A method of forming a touch sensor panel, comprising: forming a plurality of first lines of a first conductive material; forming a plurality of second line sections of the first conductive material; connecting second line sections together using a plurality of interconnect sections of a second conductive material to form a plurality of second lines, and enabling the plurality of first and second lines to cross over each other to form an array of touch sensors; and forming one or more dummy regions in an area around at least one of the plurality of first lines and the plurality of second lines, further comprising forming the one or more dummy regions on the same layer as the plurality of first lines and the plurality of second line sections.

10. The method of claim 9, further comprising forming the one or more dummy regions of the first conductive material.

11. The method of claim 9, further comprising forming the one or more dummy areas such that the dummy areas and the plurality of first and second lines are electrically isolated from one another and occupy substantially a full area of a substrate.

12. The method of claim 9, further comprising forming the one or more dummy regions of one or more repeating patterns of isolated sections.

13. The method of claim 9, further comprising:
forming at least two of the second line sections with narrowed arms; and
connecting the two second line sections together at their narrowed arms using an interconnect section.

* * * * *